United States Patent [19]

Bost

[11] 4,128,282
[45] Dec. 5, 1978

[54] COUNTERBALANCE BEARING ASSEMBLY

[75] Inventor: John R. Bost, Laurens, S.C.

[73] Assignee: Byars Machine Company, Laurens, S.C.

[21] Appl. No.: 857,269

[22] Filed: Dec. 5, 1977

[51] Int. Cl.² ............................................. F16C 13/00
[52] U.S. Cl. ......................................... 308/20; 308/22; 308/28; 308/32; 209/673
[58] Field of Search ............... 308/20, 22, 26, 28, 308/27, 29, 31, 32, 33, 74, DIG. 7; 209/97, 101, 106, 107; 198/624

[56] References Cited

U.S. PATENT DOCUMENTS

| | | | |
|---|---|---|---|
| 236,643 | 1/1881 | Stevens | 308/22 |
| 843,591 | 2/1907 | Edwards | 308/28 |
| 1,124,256 | 1/1915 | Barker | 308/26 |
| 1,282,364 | 10/1918 | Barker | 308/28 |
| 1,324,377 | 12/1919 | Bicknell et al. | 308/28 |
| 1,341,978 | 6/1920 | Gearing | 209/107 |
| 2,310,282 | 2/1943 | Gauss | 308/33 |
| 2,343,042 | 2/1944 | Barry | 308/32 |
| 2,985,494 | 5/1961 | Terhorst | 308/74 |

*Primary Examiner*—Trygve M. Blix
*Assistant Examiner*—Charles E. Frankfort
*Attorney, Agent, or Firm*—Bailey, Dority & Flint

[57] ABSTRACT

A counterbalance bearing assembly for supporting and positively positioning an end of a cylinder which has a shaft extending axially therefrom. The shaft of the cylinder extends through a first bearing. Movable apparatus is provided for supporting the first bearing and, in turn, the cylinder with the shaft extending therethrough. A guide bearing assembly engages the cylinder and positively positions the cylinder. The guide bearing includes a lower block having an arcuate shaped surface thereon and an upper block. A layer of material having a low coefficient of friction is carried on the arcuate surface of the lower block for supporting the cylinder and permitting the cylinder to rotate thereon. Apparatus is provided for adjustably moving the lower block so that the cylinder can be accurately and positively positioned during operation.

4 Claims, 4 Drawing Figures

COUNTERBALANCE BEARING ASSEMBLY

BACKGROUND OF THE INVENTION

Heretofore, spring supported bearings have been utilized for steadying shafts such as the drive shafts in automobiles. Examples of such spring support bearings are disclosed in U.S. Pat. Nos. 843,591, 1,282,364, 1,324,377, 2,310,282, and 1,124,256. While these devices may operate satisfactorily for minimizing vibrations in a shaft for an automobile, they would not be practical for accurately positioning rotating shafts relative to each other for use in a bearing sorting machine.

SUMMARY OF THE INVENTION

The present invention relates to a counterbalance bearing assembly for supporting and positively positioning an end of a cylinder which has a shaft extending axially therefrom. The cylinder may be used as part of a sorting machine wherein two of the cylinders are positioned adjacent each other with their axes diverging. Accordingly, a diverging sorting gap is provided between the two cylinders. When bearings which are to be sorted are deposited at an upper end of the cylinders, as they move down the inclined cylinders, they will pass through the sorting gap when the width of the sorting gap exceeds their diameter. Thus, by collecting the bearings at various points along the length of the sorting gap, the bearings are sorted into different sizes.

The bearing assembly includes a first bearing having a bore extending therethrough through which an end of the shaft of the cylinder extends. Movable means is provided for supporting the first bearing and, in turn, the cylinder with the shaft extending therethrough. A guide bearing assembly engages the cylinder and positively positions the cylinder. The guide bearing assembly includes a lower block having an arcuate shaped surface thereon. A layer of material having a low coefficient of friction is provided on the arcuate surface upon which the cylinder is carried. An upper block having an arcuate shaped surface with a wiper means provided thereon is positioned directly above the lower block for holding the cylinder therebetween. Groove means are provided for laterally adjusting the position of the lower block and, accordingly, adjusting the position of the cylindrical cylinder.

Accordingly, it is an important object of the present invention to provide a bearing assembly which can accurately and positively position a cylinder relative to another cylinder while minimizing wear.

Another important object of the present invention is to provide a bearing assembly for use in supporting cylinders in a bearing sorting machine which accurately maintains a sorting gap between two rotating cylinders.

Still another important object of the present invention is to provide a bearing assembly in which the majority of the load of a cylinder is supported on a counterbalance bearing while the position of the cylinder is maintained by a finely adjustable bearing block assembly.

These and other objects of the invention will become more apparent from reference to the accompanying drawing and claims wherein:

DESCRIPTION OF A PREFERRED EMBODIMENT

Figure 1:
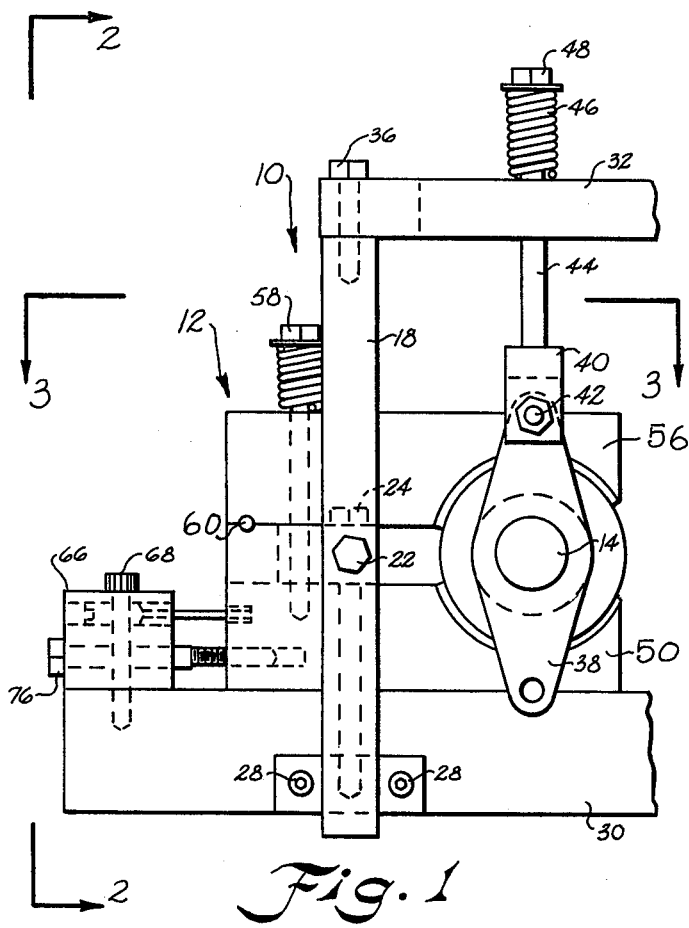
FIG. 1 is a fragmentary elevational view illustrating a bearing assembly constructed in accordance with the present invention.
Figure 2:
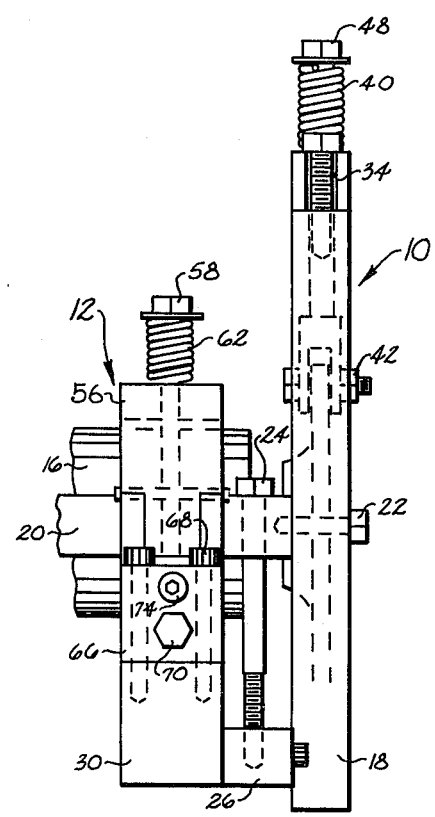
FIG. 2 is a side elevational view of a bearing assembly illustrated in FIG. 1.
Figure 3:
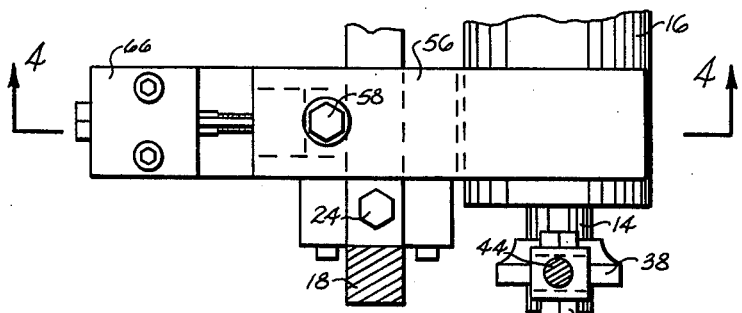
FIG. 3 is a sectional view taken along line 3—3 of FIG. 1.
Figure 4:
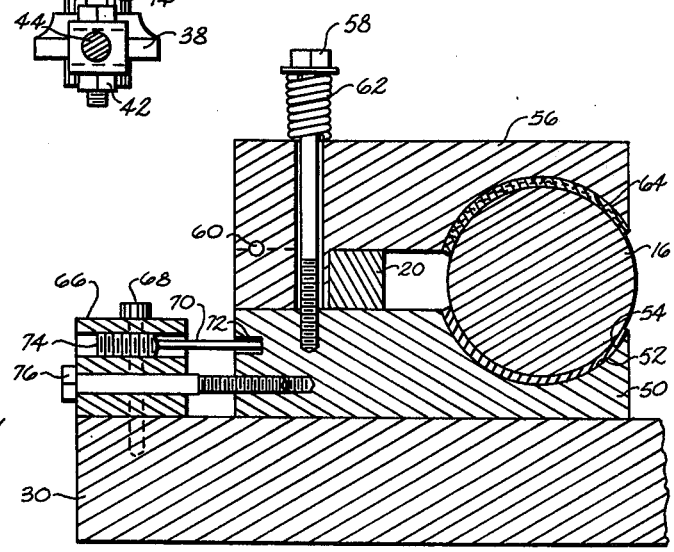
FIG. 4 is a sectional view taken along the line 4—4 of FIG. 3.

Referring in more detail to FIGS. 1 and 2 of the drawings, there is illustrated a bearing assembly which includes a counterbalance bearing assembly portion generally designated by the reference character 10 and a guide bearing assembly generally designated by the reference character 12. The purpose of the counterbalance bearing assembly is to support the majority of the load of a cylinder and a shaft. The shaft 14 extends through a cylinder 16 that may be used in a sorting machine such as disclosed in my co-pending application Ser. No. 857,270 entitled BEARING SORTING DEVICE filed on even date herewith. The guide bearing assembly 12 is provided for positively positioning the rotating cylinder 16.

Referring now to the counterbalance bearing assembly 10, it includes a vertically extending post 18 that has a horizontally extending clamping bar 20 attached to one side thereof by means of a bolt 22. The bolt 22 as illustrated in FIG. 2, extends into the end of the clamping bar 20. The other end of the clamping bar is similarly supported. Another vertically extending bolt 24 extends through a hole provided in the clamping bar and is threadably secured to a block 26. The block 26 is, in turn, secured by means of bolts 28 to a horizontal, fixed frame member 30.

Carried on the upper end of the vertical support 18 is a horizontal support bar 32 which has a bifurcated end 34 through which a bolt 36 extends for positioning the horizontal member 32 on top of the vertical member 18. The bolt 36 is not drawn tight so as to permit lateral shifting of the horizontal member 32 when aligning the bearing assembly 10. The other end of the horizontal top support member 32 is supported on a similar vertical member 18 carried on the other side of the machine.

The shaft 14, upon which the cylinder 16 is carried extends through a flanged pillow block self-aligning bearing 38 which is, in turn, supported by means of a bracket 40 which is secured thereto by a bolt 42. The bracket 40, in turn, has a shaft 44 secured thereto by any suitable means which extends through an opening provided in the horizontal member 32. A compression spring 46 is carried on the shaft 44 on the other side of the horizontal member 32 and bears against a head 48 carried on top of the shaft. As a result, the majority of the load of the shaft and cylinder is supported through the compression spring 46 bearing down on the horizontal member 32.

When the cylinder 16 is utilized in a bearing sorting machine, it is imperative that the position of the cylinder 16 be accurately maintained and adjusted. In order to maintain the position of the cylinder 16 accurately, a guide bearing assembly 12 is utilized. As a result of utilizing the guide bearing 12 in combination with the counterbalance bearing 10, frictional contact between the guide bearing 12 and the cylinder 16 is minimized.

The guide bearing 12 includes a lower horizontally extending block 50 which has an arcuate shaped recess 52 provided therein for receiving the cylinder 16. A layer of material 54 is provided on the surface of the arcuate shaped recess 52 so as to reduce the frictional contact therebetween. This layer can be constructed of any suitable material such as Teflon or carbon graphite. An upper wiper block 56 is secured to the lower block 50 by means of a bolt 58. An aligning pin 60 is carried between the lower member 50 and the upper member 56 for aiding in maintaining alignment therebetween. A spring 62 is carried on the bolt 58 for maintaining wiper contact between the upper block 56 and the cylinder 16.

The upper block 56 also has an arcuate recess provided therein upon which a wiping material 64 is carried. This wiper material may be any suitable material such as felt material which wipes the cylinder and keeps dirt and grit from getting into the Teflon bearing 54.

An aligning block 66 is provided for positively shifting the lower block 50 laterally in order to align the position of the cylinder 16 accurately. This aligning block 66 is secured by means of a vertically extending bolt 68 into the base fixed frame member 30.

A pushpin 70 extends horizontally out of the block 66 into a bore 72 provided in the lower bearing block 50. A threaded set screw 74 is carried in the block 66 in alignment with the pushpin 70 so that such can be rotated counter-clockwise to shift the block 50 to the right. When it is desired to shift the block to the left, the set screw 74 is rotated counter-clockwise and a bolt 76 which extends through the block 66 and into the block 50, is rotated counter-clockwise to return the block 50 to the right. Therefore, by manipulating the set screw 74 and the bolt 76, the lower block 50 can be accurately and positively shifted laterally.

As a result of utilizing both the counterbalance assembly 10 and the guide bearing assembly 12, very accurate and positive positioning of the cylinder 16 can be obtained while minimizing the wear on the cylinder and the bearing assembly. In other words, the counterbalance assembly 10 supports the majority of the weight of the cylinder 16 while the guide bearing assembly 12 can be manipulated for positively positioning the cylinder 16.

While a preferred embodiment of the invention has been described using specific terms, such description is for illustrative purposes only, and it is to be understood that changes and variations may be made without departing from the spirit or scope of the following claims.

What is claimed is:

1. A counterbalance bearing assembly for supporting and positively positioning an end of a cylinder which has a shaft extending axially therefrom comprising:
    a first bearing having a bore extending therethrough through which an end of said shaft extends;
    movable means for supporting said first bearing and in turn said cylinder with said shaft extending therethrough;
    a guide bearing assembly directly engaging said cylinder and positively positioning said cylinder, said guide bearing assembly including:
        (i) a lower block having an arcuate-shaped surface thereon;
        (ii) a layer of material having a low coefficient of friction carried on said arcuate surface upon which said cylinder is carried;
        (iii) an upper block having an arcuate-shaped surface thereon engaging said cylinder from a top side, and
        (iv) means for adjustably moving said lower block for positively positioning said cylinder,;
    whereby the majority of the weight of said cylinder is supported by said first bearing while said guide bearing assembly positively positions said cylinder.

2. The counterbalance bearing asembly as set forth in claim 1 further comprising:
    said movable means for supporting said first bearing comprising;
        (i) a horizontally extending member;
        (ii) a vertically extending rod having one end attached to said first bearing and the other end extending through a hole provided in said horizontally extending member;
        (iii) a resilient member carried on said rod between said horizontally extending member and the top end of said rod so that said shaft and cylinder are resiliently supported through said rod and resilient member on said horizontally extending member.

3. The counterbalance bearing assembly as set forth in claim 1 further comprising:
    a wiper material carried on said arcuate shaped surface of said upper block maintaining a clean surface on said cylinder which rests on said low coefficient of friction layer of said lower block.

4. The counterbalance bearing assembly as set forth in claim 1 wherein said means for adjustably moving said lower block comprising:
    (a) a fixed block carried adjacent said lower block,
    (b) screw means extending between said fixed block and said lower block which upon being rotated shifts said lower block laterally for adjusting the position of said cylinder.

* * * * *